United States Patent [19]
Ersoy

[11] Patent Number: 5,852,953
[45] Date of Patent: Dec. 29, 1998

[54] SHIFTING DEVICE FOR A TRANSMISSION OF MOTOR VEHICLES

[75] Inventor: Metin Ersoy, Walluf, Germany

[73] Assignee: Lemförder Metallwaren AG, Stemwede-Dielingen, Germany

[21] Appl. No.: 810,757

[22] Filed: Mar. 4, 1997

[30] Foreign Application Priority Data

Mar. 8, 1996 [DE] Germany .................. 196 08 981.6

[51] Int. Cl.⁶ ............................................. F16H 55/10
[52] U.S. Cl. ............................ 74/473.12; 74/471 XY
[58] Field of Search ...................... 74/473.12, 473.1, 74/473.25, 471 XY

[56] References Cited

U.S. PATENT DOCUMENTS

| | | | |
|---|---|---|---|
| 4,912,997 | 4/1990 | Malcolm et al. ........................ | 74/335 |
| 4,987,792 | 1/1991 | Mueller et al. ........................ | 74/473 R |
| 5,033,324 | 7/1991 | Glaser .................... | 74/473 R |
| 5,044,220 | 9/1991 | Raff et al. ............... | 74/473 R |
| 5,370,015 | 12/1994 | Moscatelli ................................. | 74/335 |
| 5,614,883 | 3/1997 | Dery et al. .............................. | 340/458 |
| 5,658,219 | 8/1997 | Kondo et al. ........................... | 477/122 |
| 5,679,091 | 10/1997 | Sazecher et al. ........................ | 477/86 |

FOREIGN PATENT DOCUMENTS

| | | |
|---|---|---|
| 195 26 059 A1 | 1/1987 | Germany . |
| 38 07 881 A1 | 9/1989 | Germany . |

*Primary Examiner*—Charles A Marmor
*Assistant Examiner*—David Fenstermacher
*Attorney, Agent, or Firm*—McGlew and Tuttle

[57] ABSTRACT

A shifting device for a transmission of motor vehicles, wherein a gearshift lever is coupled during the shifting process with a control lug, which reflects a signal, which is sent as a signal corresponding to the shift position of the gearshift lever to a control unit of the transmission.

17 Claims, 6 Drawing Sheets

| Gearshift lever position | Output | | | |
| --- | --- | --- | --- | --- |
| | a | b | c | d |
| G | 0 | 1 | 0 | 0 |
| A | 0 | 0 | 1 | 0 |
| B | 1 | 0 | 0 | 0 |
| N | 0 | 1 | 1 | 1 |
| R | 1 | 1 | 1 | 0 |
| Intermediate position | 0 | 0 | 0 | 0 |

Figure 7

SHIFTING DEVICE FOR A TRANSMISSION OF MOTOR VEHICLES

FIELD OF THE INVENTION

The present invention pertains to a shifting device for a transmission of motor vehicles, in which a selector lever is pivotable within a shift gate around a selector axis located deeper than the shift gate, and is held in the shift positions (P, R, N, D) by spring forces acting at light angles to the longitudinal direction of the shift gate against locking means, which are laterally offset in relation to one another and are associated with the shift positions, and is manually pivotable in a shift position associated with the automatic shifting for the stepwise shifting of the gears of the transmission by means of electric switches, wherein the signals corresponding to the shift positions of the gearshift lever are detected by sensors and are subsequently processed by an electronic control device, which also controls the transmission of the vehicle,

BACKGROUND OF THE INVENTION

A shifting device for an automatic transmission of a motor vehicle, in which a selector lever is mounted pivotably within a shift gate around a selector axis located deeper than the said gear shift gate and the shift positions selected are transmitted to the transmission by mechanical transmission elements, preferably cable lines, is disclosed in the Patent Application DE 195 26 059 A1. The drawback of this is that these transmission elements leading to the engine compartment require ducts with seals. Vibrations and noises are transmitted from the transmission to the gear shift mechanism. At least expensive uncoupling mechanisms are needed to prevent this. Furthermore, the space available for installation in the engine compartment is limited, so that the effort needed for arranging mechanical transmission elements is considerable. This leads to high costs for the assembly of the vehicle, which is ultimately reflected in the retail price.

It has been known from DE 38 07 881 A1 that the selected positions of the selector lever can be detected by sensors, which in turn send electrical signals to a control device of the transmission. The shifting device described in the document has two shift gates, one of which is intended for the automatic operation and the other for an optionally usable manual, stepwise shifting operation. One sensor each in the "manual shift gate" detects the shifting up or the shifting down by one gear, which is initiated by tapping the selector lever in the direction of travel and opposite the direction of travel, respectively, in the transmission. The changeover from one shift gate to the other is likewise detected by a sensor. To achieve this, an actuating lever is carried during the pivoting of the selector level, and this actuating lever engages the transmission via an actuating rod articulated to it and actuates the sensors located there for the corresponding selector positions. The sensor signals are processed in the known manner via a central processing unit, which cooperates with the control unit of the transmission.

Such a solution is very cost-intensive, because numerous components are needed. Thus, at least one sensor must be provided for each shift position of the selector lever, and at least one sensor must be provided for the pivoting of the selector lever from one shift gate to the other shift gate, and another two sensors are additionally needed for the stepwise detection of the shift positions in the "manual shift gate." The large number of necessary components considerably increases the risk of failure, so that such a design is trouble-prone and also expensive.

SUMMARY AND OBJECTS OF THE INVENTION

The object of the present invention is to scan the shift positions of the gearshift lever in a contactless manner, to minimize the number of necessary components, to control the transmission without mechanical connection with the shifting device, and to simplify the ducting of the gearshift lever.

According to the invention, a shifting device for a transmission of motor vehicles is provided in which a selector lever is pivotable within a shift gate around a selector axis located deeper than the shift gate. The selector lever is held in the shift positions (P, R, N, D) by spring forces acting at right angles to the longitudinal direction of the shift gate against locking means, which are laterally offset in relation to one another and are associated with the shift positions. The selector lever is manually pivotable in a shift position associated with the automatic shifting for the stepwise shifting of the gears of the transmission by means of electric switches. The signals corresponding to the shift positions of the gearshift lever are detected by sensors and are subsequently processed by an electronic control device, which also controls the transmission of the vehicle. The gearshift lever is coupled with a control lug provided with signal surfaces. The control lug corresponds to sensors, wherein the sensors transmit a signal corresponding to the shift position of the gearshift lever to a control unit of the transmission.

Such a shifting device can be used for different types of gear shifting, e.g., for automatic shifting with one or more shift gates, for shifting with stepwise, manual shifting range, in which the upshifting and downshifting of the transmission is performed by briefly tapping the gearshift lever in the corresponding direction, or optionally even for exclusively manual shifting.

According to the solution proposed, a selector or gearshift lever is coupled with a control lug during the shifting process. The transducers (sensors) now detect a signal returned by the control lug and send it to the control system of the transmission after corresponding signal processing. The signal processing and the control system of the transmission may be provided in a central processing unit (CPU).

Optical sensors may be used according to the present invention, in which case an optical signal is reflected by reflection surfaces on the control lug and is detected by the sensors. It is also possible to use components which act both as sensors and send the signal to be detected themselves beforehand.

Moreover, other contactless measured value detection means are also conceivable and are within the scope of the basic idea of the invention. For example, the control lug may be provided with magnetized areas, whose movement induces a voltage in the sensors (Hall sensors), utilizing the Hall effect, and the said voltage can in turn be used for further processing.

A gearshift lever is mounted in a gearshift housing such that it can be moved along and at right angles to the direction of travel. The peg-shaped transition area of the gearshift lever, which is located under the mounting axes, and with which a pin engaging the control lug is in turn made in one piece, is restrictedly guided in a sliding block.

The sliding block has a guide contour which corresponds to the shift pattern of the shifting device. The movement of the gearshift lever moves the control lug into the range of action of the sensors.

The gearshift lever is mounted in a crosspiece, on two axes, which are located at right angles to each other in space. These are the selector axis and the shifting axis. Under the point of mounting of the gearshift lever, the crosspiece has a yoke-shaped area, in which a surface having a defined profile is milled on at least one side. Spring-loaded locking means, which are fastened to the gearshift lever, cooperate with the profiled surface. The locking means may comprise spring-loaded rollers or balls. However, simple sliding elements made of plastic are also within the scope of the basic idea of the invention.

A plurality of shift gates may, of course, be provided in a shifting device according to the present invention. The yoke-shaped area of the crosspiece is designed in this case corresponding to the number of shifting steps. In such a design, the locking means makes possible the stepwise selection of these shifting steps by the spring-loaded rollers or balls engaging complementary recesses of the yoke-shaped area of the crosspiece.

Each shift position of the gearshift lever is detected by sensors of the above-described type. According to the solution according to the present invention, a coding corresponding to a binary matrix is assigned to each shift position. If optical sensors are used, reflection surfaces are provided on the control lug, and the said reflecting surfaces transmit the signals sent to them to the sensors. The free areas on the control lug thus generate a "0 signal," and the reflection surfaces generate a "1 signal." These binary signals of the sensors are sent via the CPU to the control system of the transmission, where they trigger the corresponding shifting process. Markedly fewer sensors are needed due to this coding than in the case of the prior-art designs.

In shifting devices with stepwise shifting (tapping) in the longitudinal or transverse direction, for which the solution according to the present invention is especially advantageous, the spring-loaded locking means and the design of the profiled surfaces ensure that the gearshift lever resumes its neutral position after the completion of the shifting process. Since the signals reflected by the control lug are received by the sensors in a contactless manner and are subsequently sent to the control system, the driver of the vehicle naturally does not have the "feeling of shifting," because there is no mechanical connection between the gearshift lever and the transmission in the shifting device according to the present invention.

To impart this familiar "feeling of shifting" to the driver of the vehicle, a shifting device according to the present invention is provided with a surface having a defined profile in the yoke-shaped area of the crosspiece. This comprises, in the case of a shifting device for exclusive stepwise shifting (tapping), a wave profile with only one depression, which always rises in the direction of the shifting movements. The spring-loaded locking means provided at the gearshift lever cooperate with a surface having such a profile and thus they make it possible to simulate each desired shifting force intensity, corresponding to the selection of the spring or of the slope.

A locked step, in which the gearshift lever is locked after overcoming the reverse gear block, may be additionally present for the reverse gear. The design of the cover of the gearshift housing with the gearshift lever opening provided therein, through which the gearshift lever is guided, may be kept very simple in an embodiment according to the present invention, because only one opening, e.g., a hole, is needed. This opening is provided with an elastic sealing bellows, so that the complete shifting mechanism is hermetically sealed against dust, liquids and similar contaminants.

The gear shift gates with the known sealing problems toward the passenger compartment are eliminated. The shifting device has a simple and inexpensive design of a joystick shifting mechanism.

A preferred embodiment of the object of the present invention is shown in the drawing and will be described below.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
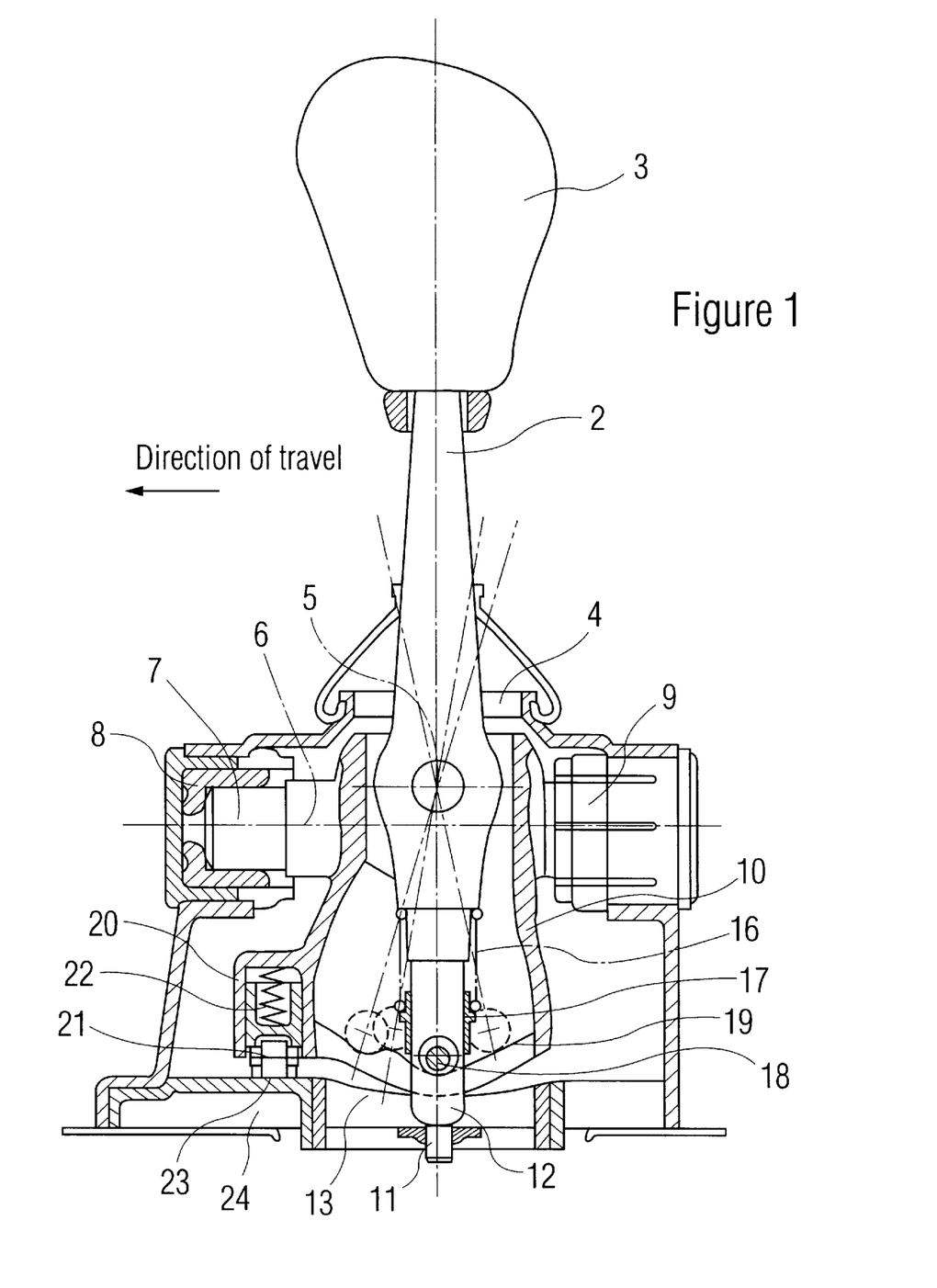
FIG. 1 is a sectional view of a shifting device according to the present invention, the section being taken along a plane extending in the longitudinal direction of the vehicle.

Referring to the drawings in particular, FIG. 1 shows a sectional view of a shifting device according to the present invention, the section being taken along a plane extending in the longitudinal direction of the vehicle. The shifting device is arranged in a housing 1 such that a gearshift lever 2 is guided by a gearshift lever guide 4 within the housing cover, and a shift knob 3 is arranged at the end of the said gearshift lever facing the driver.

A shifting axis 5 (transverse direction of the vehicle) is located at right angles to a selector axis 6 (longitudinal direction of the vehicle). The gearshift lever 2 is mounted pivotably around both axes. The selector axis 6 is formed by a bolt 7, which in turn is mounted in the housing 1 of the shifting device via bearing bushes 8, 9. The bolt 7 is connected in one piece to a crosspiece 10.

The lowermost end of the gearshift lever 2 is designed as a pin 11, which joins a peg-shaped transition area 12 of the gearshift lever 2. The peg-shaped transition area 12 is restrictedly guided in a sliding block 13, whose guide contour 14 corresponds to the shifting pattern of the shifting device. The pin 11 guides a control lug 15. A first, spring-loaded locking means 18, which rolls on or slides along a surface 19 of a yoke-shaped area of the crosspiece 10, which said surface has a defined profile, during the shifting movement, is arranged in the lower part of the gearshift lever 2 at a slide 17 supported by a compression spring 16. This locking means comprises here a spring-loaded roller each, which are arranged axially in parallel to the shifting axis 5 located higher on both sides of the gearshift lever 2. The familiar "feeling of shifting" known from mechanical shifting devices is imparted to the driver of the vehicle by the first locking means, which is achieved due to the spring rigidity of the compression spring 16 and the curved shape of the surface 19 having a defined profile. Furthermore, the locking means has the function of returning the gearshift lever 2 into the basic position G. To simulate the selection process (transverse tapping), a second locking means is arranged at the part of the yoke-shaped part of the crosspiece 10, which is the front part when viewed in the direction of travel. A roller holder 20 now receives a roller 21, as well as a compression spring 22 acting against the said roller 21. The roller 21 is guided on a defined surface 23 of a bottom plate 24 of the housing 1.

Figure 2:
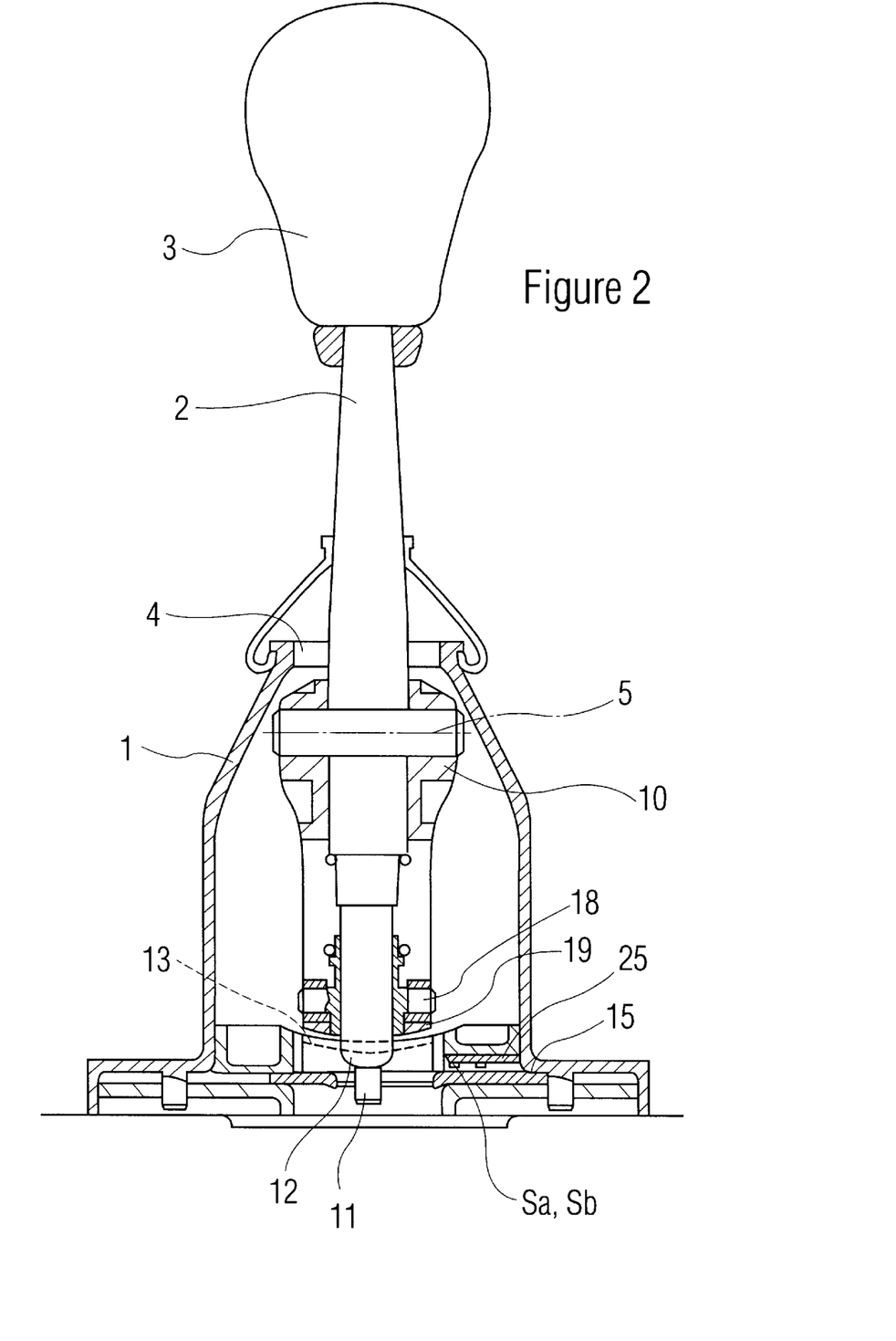
FIG. 2 is a sectional view of a shifting device according to the present invention, the section being taken along a plane extending in the transverse direction of the vehicle.

FIG. 2 shows a sectional view of a shifting device according to the present invention, the section being taken along a plane extending in the transverse direction of the vehicle.

In addition to the description of FIG. 1, the mounting of the gearshift lever 2 on the shifting axis 5 is clearly recognizable here. The shifting axis used is a simple bolt. The spring-loaded locking means 18, which is arranged on both sides of the gearshift lever 2 and acts against the surface 19 of the yoke-shaped area of the crosspiece 10, which area has a defined profile, is shown in the lower part of the figure.

The pin 11, which is made in one piece with the gearshift lever 2 under the peg-shaped transition area 12 guided in the sliding block 13, moves the control lug 15 into the range of action of the sensors (Sa, Sb, Sc, Sd). These sensors are mounted on a printed circuit board 25. They are optical sensors in the design of a shifting device according to the present invention shown. They receive signals from the control lug 15 and transmit them to a control system.

Figure 3:
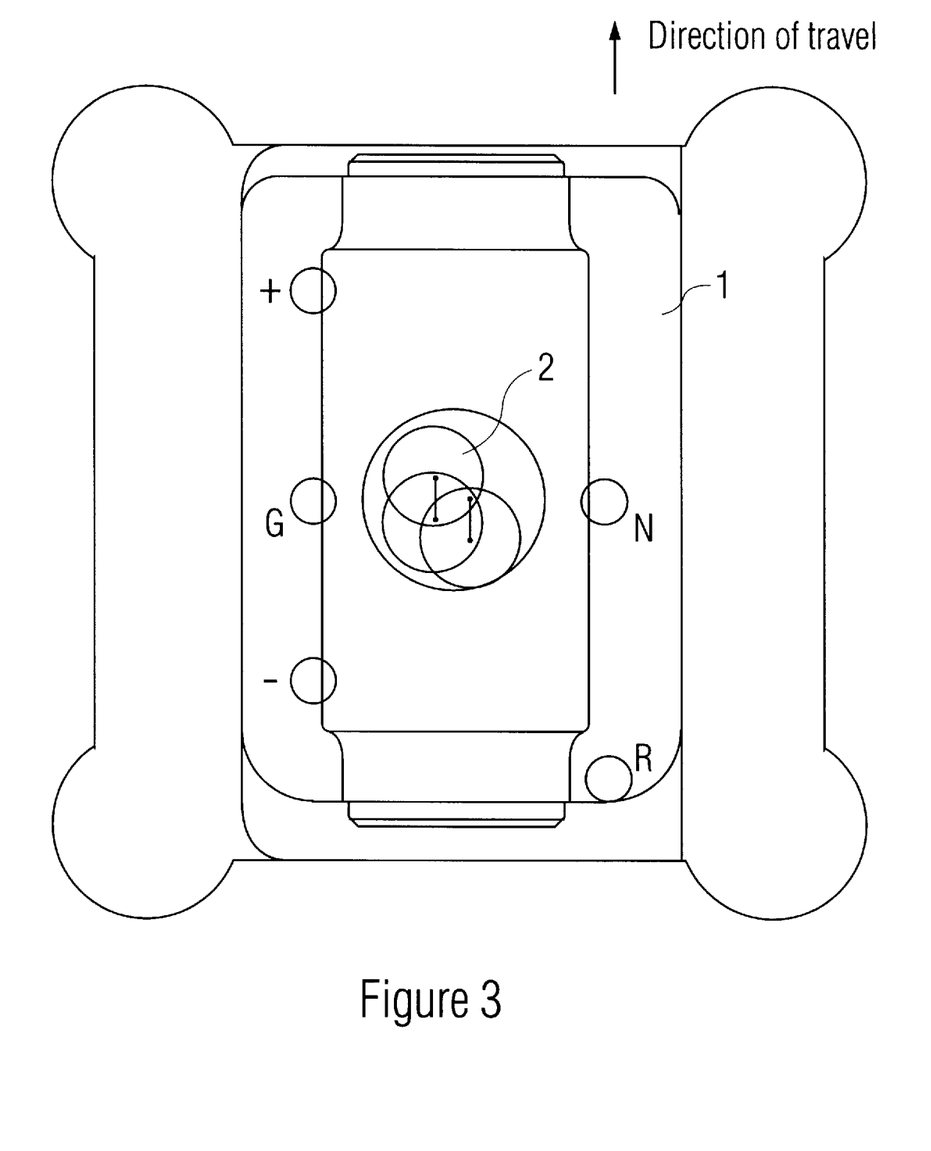
FIG. 3 is the view of the shifting diagram of a shifting device according to the present invention.

FIG. 3 shows the view of an example of the shifting diagram of a shifting device according to the present invention. The gearshift lever duct 4 in the cover of the housing 1 is designed as an oval, in which the gearshift lever 2 is in the middle position. The shifting diagram has the shifting steps "G,", "+," and "−" for the forward gears and "N" for the neutral position, as well as "R" for the reverse gear. The gearshift lever 2 is in the basic position "G" during normal travel. The next higher or next lower gear is selected by tapping in the "+" or "−" direction.

To select the reverse gear, a tapping selection movement at right angles to the direction of travel must first be performed, so that the forward gears are switched off in order to subsequently select the reverse gear by tapping the gearshift lever 2 in the direction "R."

In position R, the gearshift lever 2 with its spring-loaded locking means 18 is locked due to the corresponding design of the surface 19 having a defined profile. If the reverse gear, i.e., position "R," has to be left again, a force, which is determined, as was described above, by the shape of the surface 19 having a defined profile and by the dimensioning of the compression spring 16, must be manually applied to the gearshift lever 2 in order to bring the gearshift lever 2 again into position N, from which it will pivot again into the basic position G itself.

Figure 4:
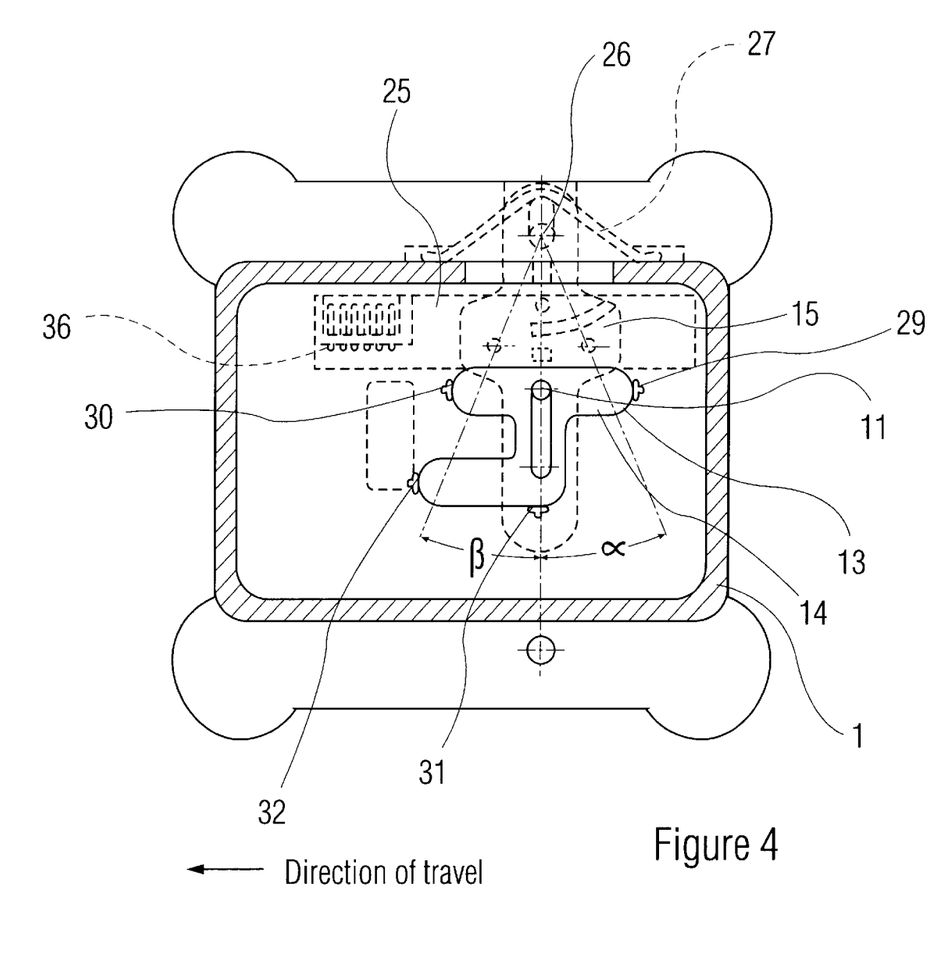
FIG. 4 is a sectional view of a shifting device according to the present invention at the level of the sliding block with the control lug located under it.

FIG. 4 shows a sectional view of a shifting device according to the present invention at the level of the sliding block 13 with the subjacent control lug 15. The peg-shaped transition area 12 of the gearshift lever 2 is restrictedly guided in the guide contour 14 of the sliding block 13.

The control lug 15 is arranged pivotably around a pivot axis 26 and is held in the starting position or is returned into that position by a leaf spring 27. The pin 11 of the gearshift lever 2 engages a recess 28 of the control lug 15. The guide contour 14 of the sliding block 13 has damping elements 29, 30, 31, 32 at its end points, and the said damping elements damp the peg-shaped transition area 12 of the gearshift lever 2 during the shifting in the corresponding directions "+," "−," "N" and "R" at the end points.

The gearshift lever 2 passes with its pin 11 through the control lug 15 in its recess 28.

The shifting process will be described below in detail based on the structural interaction between the control lug 15 and its reflecting surfaces 33, 34 and 35, on the one hand, and the sensors Sa, Sb, Sc and Sd, on the other hand, which is shown in FIG. 4.

Figure 7:
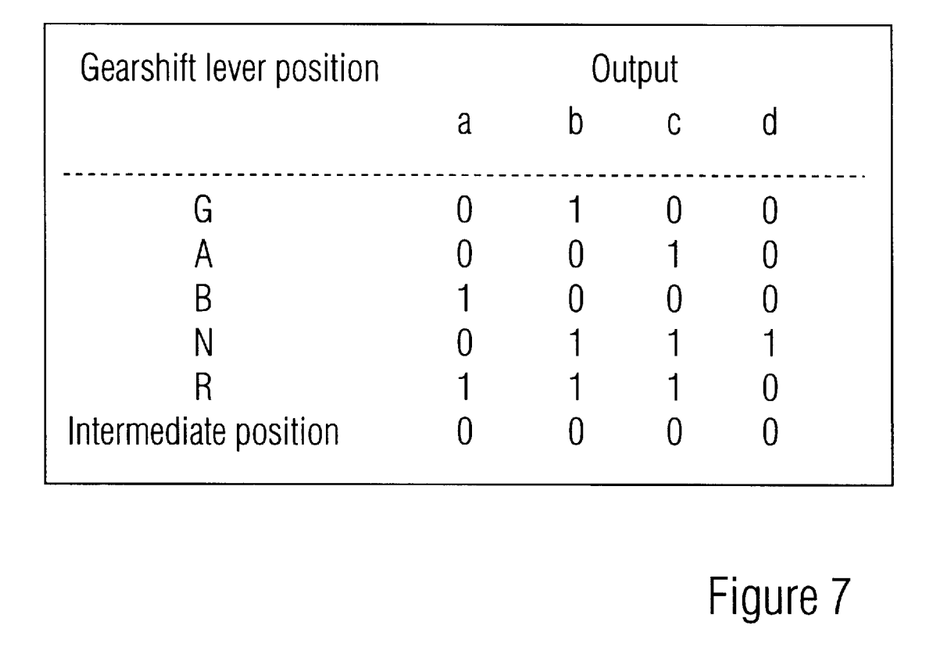
FIG. 7 is a binary matrix for coding 6 shift positions.

The gearshift lever 2 is in the gearshift position G in the basic position G. The sensor Sb detects the signal reflected by the reflection surface 35 and forms the corresponding signal at the output b of the control chip via the said binary matrix (FIG. 7). This is designed as a plug 36.

On tapping from the basic position G in direction "+" (positive direction=higher gear), the gearshift lever 2 pivots around the shifting axis 5, is moved with its peg-shaped transition area 12 in the guide contour 14 in the direction of the damping element 29, and with its pin 11, it pivots the control lug 15 by the angle α. The sensor Sc detects the signal reflected by the reflection surface 35 and forms the corresponding signal at the output c via the said binary matrix. The gearshift lever 2 then returns into the basic position G, because the locking means 18, which slides on the surface 19 having a defined profile during the shifting movement, is arranged at the slide 17 supported by the compression spring 16 in the lower part of the gearshift lever 2. The profiled surface 19 is shaped such that the locking means 18 must again slide back into the basic position G and thus it returns the gearshift lever 2 into the basic position G.

When the gearshift lever 2 is tapped from the basic position G in direction "−" (negative direction=selection of lower gear), the gearshift lever 2 pivots around the shifting axis 5, and the peg-shaped transition area 12 is moved this time in the direction of the damping element 30 in the guide contour 14, and the control lug 15 is pivoted by the pin 11 by an angle β.

The sensor Sa detects the signal reflected by the reflection surface 35 and forms the corresponding signal at the output a via the said binary matrix. The gearshift lever 2 then returns into the basic position G.

When the gearshift lever 2 is tapped from the basic position G in the direction of position N, the gearshift lever 2 pivots around the selector axis 6 of the bolt 7 mounted in bearing bushes 8 and 9 in a vibration-uncoupled manner. The crosspiece 10 is also being pivoted during this movement of the gearshift lever 2, because it must participate in the pivoting of the gearshift lever 2 via the shifting axis 5. The peg-shaped transition area 12 is moved in the direction of the damping element 31, and the pin 11 carries the control lug 15 in the recess 28. The displacement of the control lug 15 in the direction pointing toward the damping element 31 is permitted by the recess 37, which is engaged by the pivot axis 26. The reflection surfaces 33 and 34 are moved together under the sensors Sd, Sb and Sc. Corresponding signals are received at the outputs b, c and d via the binary matrix.

If the gearshift lever 2 is again released in position N, it returns into the basic position G due to the design of the defined surface 23. However, if it is desirable to select the reverse gear, the gearshift lever 2 must be pivoted out of position N in the direction R according to the shifting diagram (FIG. 3), and a reverse lock must be overcome. This is achieved by the surface 19 having a defined profile rising more steeply at the corresponding point and by a top dead center having to be overcome by the locking means 18.

The gearshift lever 12 is restrictedly guided in the direction of the damping element 32, and the pin 11 carries with it the control lug 15 in its recess 28. The reflection surface 34 is moved under the sensors Sa, Sb and Sc. The signals reflected by the reflection surface 34 are received by the sensors Sa, Sb and Sc, processed via the control chip in the desired coding, and corresponding signals are sent to the outputs a, b and c.

If the gearshift lever 2 is in an intermediate position between the positions "+," "G," "–," "N" and "R," none of the reflection surfaces 33, 34 and 35 reflects a signal to one of the sensors Sa, Sb, Sc, Sd, and no signal is sent to one of the outputs (i.e., a "0" signal is sent in the binary sense), and this also means a defined state of the control and of the transmission.

Figure 5:
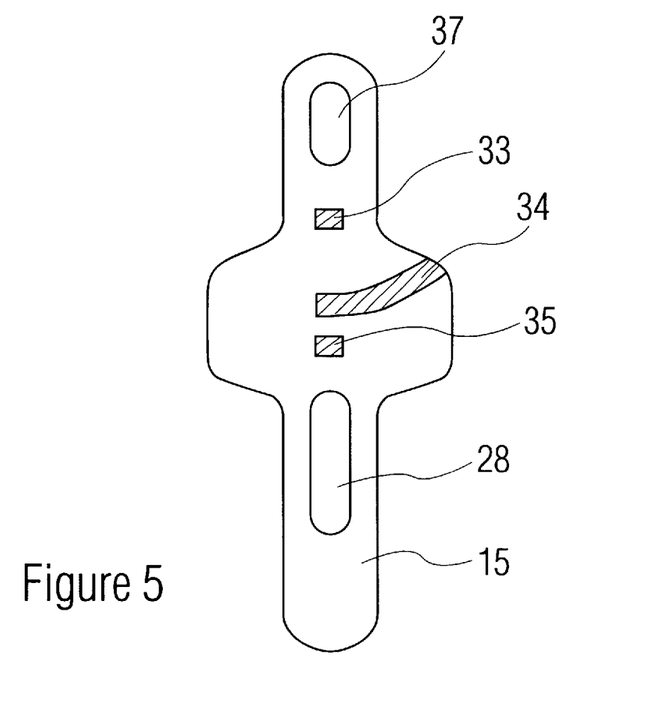
FIG. 5 is a control lug according to the present invention.

FIG. 5 shows a possible embodiment of a control lug according to the present invention. In the exemplary embodiment shown, the control lug 15 has reflection surfaces 33, 34 and 35. These correspond to the optical sensors Sd, Sa, Sb and Sc.

Figure 6:
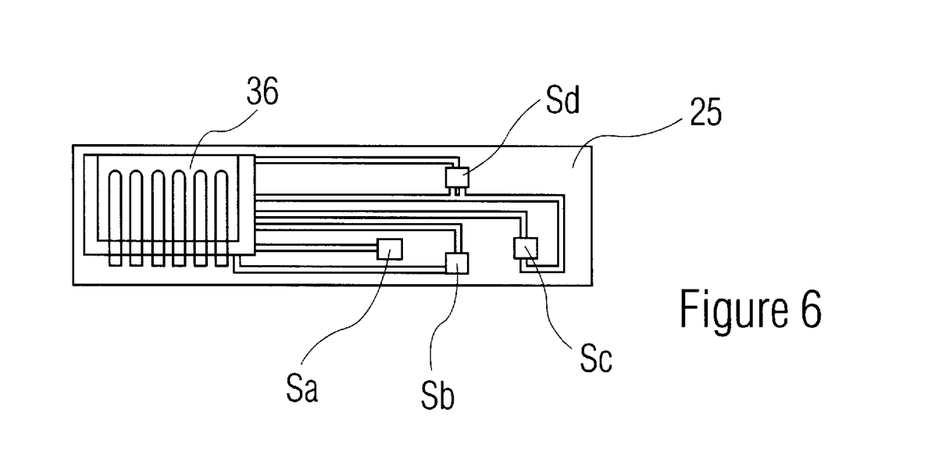
FIG. 6 is the schematic view of the printed circuit board of a shifting device according to the present invention with the sensors located under it.

FIG. 6 shows a possible embodiment of a printed circuit board 25 according to the present invention with a plug 36. A control chip, not shown, receives the measured values detected by the sensors and processes them further, so that it is possible to control the transmission. The control chip contains the central processing unit (CPU). The sensors Sa, Sb, Sc and Sd are installed under the printed circuit board 25 (they are therefore indicated by broken lines).

FIG. 7 shows an example of a possible binary matrix. A binary coding, which can be described by "0" and "1" signals, corresponds to each gear step to be selected.

Three sensors and one four-pole plug would, in principle, be sufficient to sense up to six positions. However, to increase safety against incorrect shifting, the exemplary embodiment explained has four sensors and a six-pole plug 36 to unambiguously detect the six positions:

| | |
|---|---|
| Basic position | G |
| Upshifting | + |
| Downshifting | – |
| Neutral position | N |
| Position | R (reverse) | and the corresponding intermediate positions.

The sensor Sd is additionally introduced to increase the safety of shifting.

While a specific embodiment of the invention has been shown and described in detail to illustrate the application of the principles of the invention, it will be understood that the invention may be embodied otherwise without departing from such principles.

What is claimed is:

1. A shifting device for a transmission of motor vehicles, comprising:

a gearshift selector lever;

a shift lever duct with a duct opening, said selector lever being pivotable within said shift lever duct around a selector axis located deeper than said duct opening;

spring loaded locking means for providing spring forces acting at right angles to said duct opening for holding said shift lever in at least one of a plurality of shift positions, said shift positions being disposed laterally offset in relation to one another, said shift lever being manually pivotable in a shift position associated with the automatic shifting for the stepwise shifting of the gears of the transmission;

a plurality of sensors, each sensor being disposed adjacent to a shifting position; and a control lug provided with signal surfaces, said gearshift selector lever being coupled with said control lug, said control lug being movable to locations with at least one of said signal surfaces disposed adjacent to one of said sensors, wherein at least one of said sensors transmit a signal corresponding to a shift position of said gearshift lever to a control unit of the transmission.

2. The shifting device in accordance with claim 1, wherein said sensors are optical sensors said signal surfaces of said control lug are reflection surfaces.

3. The shifting device in accordance with claim 1, wherein said sensors are Hall sensors and said signal surfaces of said control lug are magnetized areas.

4. The shifting device in accordance with claim 1 wherein forces for feeling the shifting movements of the gearshift selector lever in the gearshift mechanism are generated by means of surfaces having a defined profile in contact with said locking means.

5. The shifting device in accordance with claim 1, further comprising a sliding block, said gearshift selector being restrictedly guided under its fulcrum point in said sliding block.

6. A shifting device in accordance with claim 5, wherein:

said sliding block defines a plurality of slots and includes damping elements positioned at ends of said slots.

7. A shifting device in accordance with claim 5, wherein:

said sensors are fastened to a printed circuit board.

8. A shifting device in accordance with claim 1, further comprising:

a housing, said gearshift selector lever being pivotal in said housing, said control lug being separately pivotal in said housing from said gearshift selector lever for movement into said locations.

9. A shifting device in accordance with claim 8, further comprising:

a spring biasing said control lug into one of said locations.

10. A shifting device for a transmission of motor vehicles, comprising:

a gearshift selector lever;

a plurality of sensors, each sensor being disposed adjacent to a shifting position; and a control lug provided with signal surfaces, said gearshift selector lever being coupled with said control lug, said control lug being movable to locations with at least one of said signal surfaces disposed adjacent to one of said sensors, wherein at least one of said sensors transmit a signal corresponding to a shift position of said gearshift lever to a control unit of the transmission;

a shift lever duct with a duct opening, said selector lever being pivotable within said shift lever duct around a selector axis located deeper than said duct opening;

spring loaded locking means for providing spring forces acting at right angles to said duct opening for holding said shift lever in at least one of a plurality of shift positions, said shift positions being disposed laterally offset in relation to one another, said shift lever being manually pivotable in a shift position associated with the automatic shifting for the stepwise shifting of the gears of the transmission;

a surface structure defining surfaces, wherein forces for feeling the shifting movements of the gearshift selector lever in the gearshift mechanism are generated by surfaces having a defined profile in contact with said locking means.

11. A shifting device in accordance with claim 10, wherein:

said control lug is movable to move one of said signal surfaces into and out of detection by said one sensor.

12. A shifting device in accordance with claim 10, wherein:

said control lug is movable to move a different one of said signal surfaces into and out of detection by a different one of said sensors in each of said shift positions.

13. A shifting device in accordance with claim 10, wherein:

said control lug is selectively movable to move different said signal surfaces into and out of detection by different said sensors in each of said shift positions to create a plurality of binary codings, each of said binary encodings corresponding to one of said shift positions.

14. A shifting device in accordance with claim 10, wherein:

said control lug defines a slot and said gearshift lever includes a pin positioned in said slot for moving said control lug into said locations.

15. The shifting device in accordance with claim 10 wherein said sensors are optical sensors said signal surfaces of said control lug are reflection surfaces.

16. The shifting device in accordance with claim 10 wherein said sensors are Hall sensors and said signal surfaces of said control lug are magnetized areas.

17. The shifting device in accordance with claim 10, further comprising a sliding block, said gearshift selector being restrictedly guided under its fulcrum point in said sliding block.

* * * * *